US008922551B2

(12) United States Patent
Mikkelsen

(10) Patent No.: US 8,922,551 B2
(45) Date of Patent: Dec. 30, 2014

(54) METHOD AND SYSTEM FOR FACILITATING CONTROL OF AN INDUSTRIAL SYSTEM

(71) Applicant: Christine Mikkelsen, Vasteras (SE)

(72) Inventor: Christine Mikkelsen, Vasteras (SE)

(73) Assignee: ABB Research Ltd. (CH)

( * ) Notice: Subject to any disclaimer, the term of this patent is extended or adjusted under 35 U.S.C. 154(b) by 0 days.

(21) Appl. No.: 13/902,254

(22) Filed: May 24, 2013

(65) Prior Publication Data

US 2013/0257863 A1   Oct. 3, 2013

Related U.S. Application Data

(63) Continuation of application No. PCT/EP2011/070885, filed on Nov. 24, 2011.

(30) Foreign Application Priority Data

Nov. 26, 2010   (EP) .................................. 10192773

(51) Int. Cl.
*G06T 15/00* (2011.01)
*G05B 23/02* (2006.01)
*G05B 15/00* (2006.01)

(52) U.S. Cl.
CPC ............ *G05B 15/00* (2013.01); *G05B 23/0267* (2013.01)
USPC ............................. 345/419; 345/420; 700/83

(58) Field of Classification Search
None
See application file for complete search history.

(56) References Cited

U.S. PATENT DOCUMENTS

| 6,108,005 A * | 8/2000 | Starks et al. .................. 345/419 |
| 2007/0019888 A1 * | 1/2007 | Larking .......................... 382/302 |
| 2008/0049013 A1 | 2/2008 | Nasle |
| 2008/0062141 A1 | 3/2008 | Chandhri |
| 2008/0065243 A1 * | 3/2008 | Fallman et al. ................. 700/83 |

FOREIGN PATENT DOCUMENTS

| DE | 102004003570 A1 | 3/2005 |
| EP | 1311536 A1 | 7/2003 |
| WO | 2010121671 A1 | 10/2010 |

OTHER PUBLICATIONS

European Search Report Application No. EP 10 19 2773 Completed: Aug. 1, 2011; Mailing Date. Aug. 11, 2011 9 pages.
International Preliminary Report on Patentability Application No. PCT/EP2011/070885 Completed: Oct. 26, 2012 13 pages.
International Search Report and Written Opinion of the International Searching Authority Application No. PCT/EP2011/070885 Completed: Jan. 12, 2012; Mailing Date: Jan. 19, 2012.
Davian: "Restoring Files From Time Machine Backups (Mac OS x 10.5, Mac OS x 10.6)"; May 2010: pp. 1-3; XP002654915; Retrieved from Internet: URL:http//www.askdrtech.com/solutions/post/Restoring-files-from-Time-Machine-backups . . . .

* cited by examiner

*Primary Examiner* — Said Broome
(74) *Attorney, Agent, or Firm* — St. Onge Steward Johnston & Reens LLC

(57) ABSTRACT

A method for displaying a two-dimensional image in a three-dimensional view. The two-dimensional image is formed by a plurality of objects representing elements of an industrial system. The three-dimensional view is displayed on a display of a control system of the industrial system, wherein at least one object is associated with a parameter value pertaining to a state of a corresponding element in the industrial system. The method includes determining the parameter value for the object; mapping the parameter value to a depth layer, which depth layer defines part of the three-dimensional view; and displaying the object in the depth layer. A corresponding control system is also presented herein.

13 Claims, 5 Drawing Sheets

METHOD AND SYSTEM FOR FACILITATING CONTROL OF AN INDUSTRIAL SYSTEM

FIELD OF THE INVENTION

The invention generally relates to industrial systems and in particular to display techniques for monitoring and controlling an industrial system.

BACKGROUND OF THE INVENTION

Displays for industrial control systems, process control systems, Supervisory Control and Data acquisition (SCADA) systems and the like are used to display a graphic diagram of the industrial system to operators monitoring the industrial system.

Operators may thereby be able to recognize an alarm or a trend in the industrial system and, as a result, take measures to solve the problem giving rise to the alarm or trend.

FIG. 1 shows an example of a single line diagram of part of a distribution system 1 in a power grid. There is a lot of different information in the single line diagram relating to the distribution system that it represents. Some elements or equipment is presented in a different color to indicate a different type of information.

The diagram shows two buses, lines A and B which each supply a number of transformers, bays and a number of sub-systems or sub-stations.

A transformer is indicated by a graphic symbol for a generator 3 and a transformer 3 is indicated by a generator symbol. Beside the generator object, a value for reactive power or reactive effect of −44.4 MVAr is also displayed in a contrasting color to the color of the other values displayed in the rest of the schematic diagram. Thus the attention of an operator is drawn to a reduced and selected number of values displayed in a contrast color. Hence a state or value that is different from a pre-set state or value may be displayed in a way to show that the state or value diverges from the pre-set value.

However the exemplary process diagram of a two-dimensional representation for a part of a power network control system is still somewhat cluttered. A great number of numerical displays of states and values are often arranged in one single process diagram, presenting a challenge to an operator as being difficult both to absorb an overview as well as to focus on one or more values or equipment states in particular.

Patent application US2008/0049013 discloses systems and methods for real-time advanced visualization for predicting the health, reliability and performance of an electrical power system. In particular, a system for real-time three dimensional visualization of an electrical system is disclosed. A virtual system modeling engine predicts data output for an electrical system. A three-dimensional visualization engine renders the virtual system model and forecasted aspects into a three-dimensional visual model.

Another process visualization system is known from DE 10 2004 003 570.

However for the purposes of supervision and control of computer controlled power distribution systems as well as some other industrial processes and automation, there exist drawbacks with known display systems and methods.

SUMMARY OF THE INVENTION

A general object of the present invention is to provide a method and control system which facilitates for an operator of an industrial system to monitor and control the industrial system.

The above object is achieved by, in a first aspect of the present invention, providing a method for displaying a two-dimensional image in a three-dimensional view, the two-dimensional image being formed by a plurality of objects representing elements of an industrial system, the three-dimensional view being displayed on a display device of a control system of the industrial system, wherein at least one object is associated with a parameter value pertaining to a state of a corresponding element in the industrial system, wherein the method comprises:

determining the parameter value for the at least one object,
mapping the parameter value to a depth layer, which depth layer defines part of the three-dimensional view, and
displaying the at least one object in the depth layer.

Thereby, the at least one object may be displayed in a depth layer which may facilitate for a user to detect when a state of an element or equipment in the industrial system changes such that it should be brought to the attention of an operator monitoring the industrial system.

The present invention hence displays a three-dimensional view with objects displayed in different depth layers based on the parameter value of each object and not on the topographical location of the corresponding element or equipment in the industrial system.

An object is herein defined to represent an element or equipment in an industrial system in the two-dimensional image and the three-dimensional view.

One embodiment may comprise: repeating the steps of determining and mapping, and provided that the mapping determines another depth layer; displaying the at least one object in the another depth layer. Hence, the process repeatedly evaluates the parameter value, in order to determine whether a state of the element or equipment in the industrial system has changed in a manner which should be brought to the attention of an operator of the control system by displaying that or those objects in a suitable depth layer.

The step of mapping comprises mapping the at least one object to a depth layer in a near field of the three-dimensional view when the parameter value deviates from a criterion associated with a corresponding element in the industrial system. By mapping the parameter value to a near field depth layer and displaying the object in the said near field depth layer, an operator monitoring the industrial system via the display device will easily detect deviations in the behavior of the corresponding element or equipment in the industrial system.

The step of mapping may comprise comparing the parameter value of the at least one object with the criterion associated with the corresponding element in the industrial system.

The criterion is herein defined as an accepted behavior of the element or equipment. An accepted behavior may for instance be a range of accepted measurement values measured at the element or equipment in the industrial system.

The step of displaying may comprise visually moving the at least one object from the depth layer to the another depth layer. Thereby it may be easier for an operator to detect an event such as a change in a state of an element or equipment in the industrial system.

One embodiment may further comprise: determining an object category associated with the at least one object, the object category pertaining to a category of its element in the industrial system; and mapping the at least one object to a depth layer based on the object category.

One embodiment may comprise associating a range of parameter values with the depth layer. Thereby a parameter value may be mapped to a depth layer which has that parameter value within its range.

Each parameter value may correspond to a dynamic process of the industrial system.

The two-dimensional image may be a schematic diagram of the industrial system.

The three-dimensional view may be a stereoscopic view.

According to a second aspect of the present invention there is provided a control system for controlling an industrial system, which control system is connected to the industrial system.

The control system comprises:
- a display device configured to display a two-dimensional image in a three-dimensional view, which two-dimensional image is formed by a plurality of objects representing the industrial system, wherein at least one object is associated with a parameter value pertaining to a state of a corresponding element in the industrial system,
- a processor configured to determine the parameter value for at least one object, and to map the parameter value to a depth layer, which depth layer defines part of the three-dimensional view,
- the display device being configured to display the at least one object in the depth layer.

Additional features and advantages will be disclosed in the following.

BRIEF DESCRIPTION OF THE DRAWINGS

The invention and the advantages thereof will now be described by way of non-limiting examples, with reference to the accompanying drawings of which.

DETAILED DESCRIPTION OF THE INVENTION

Figure 1:
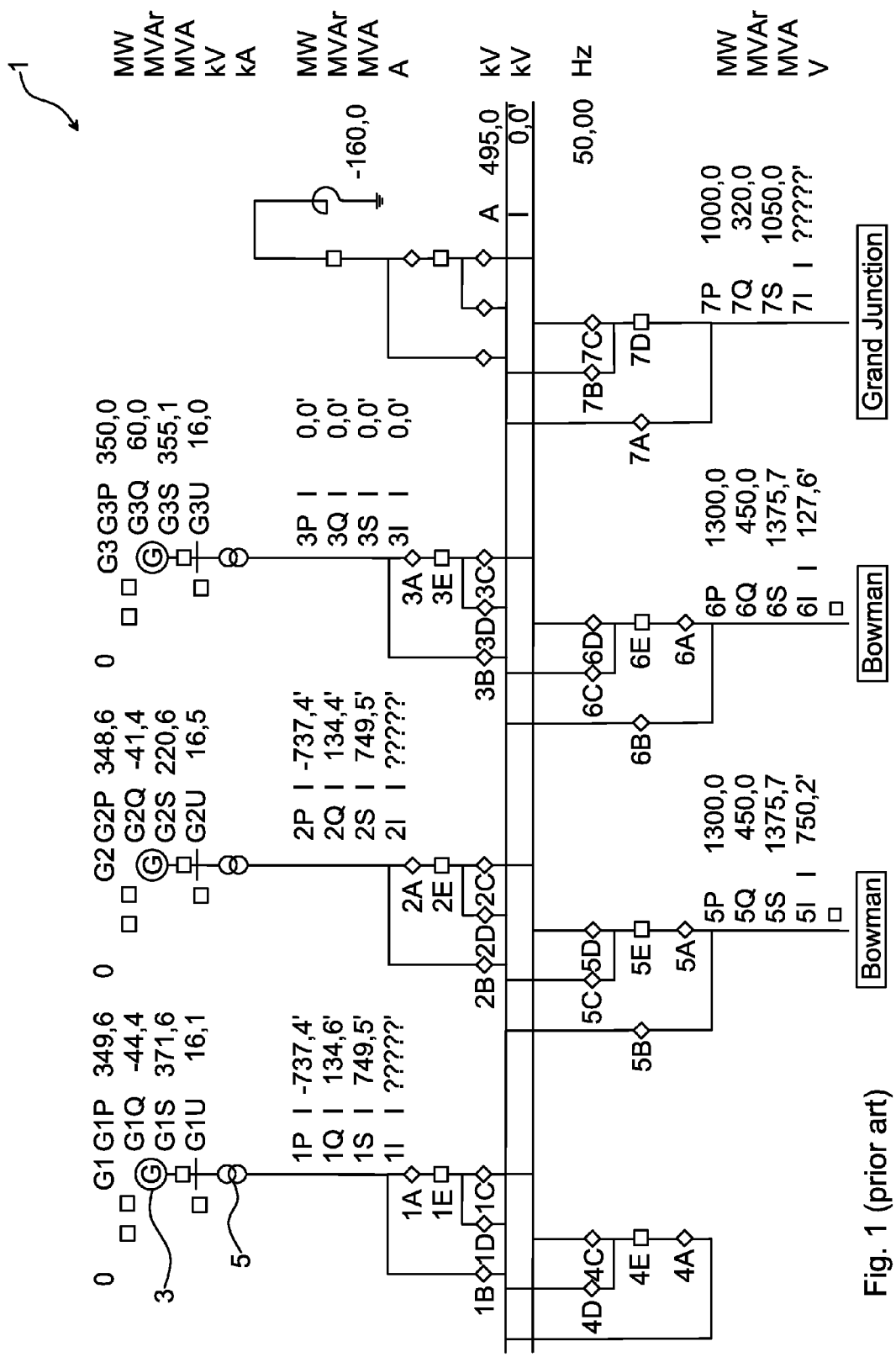
FIG. 1 shows a two-dimensional single line diagram according to prior art.
Figure 2:
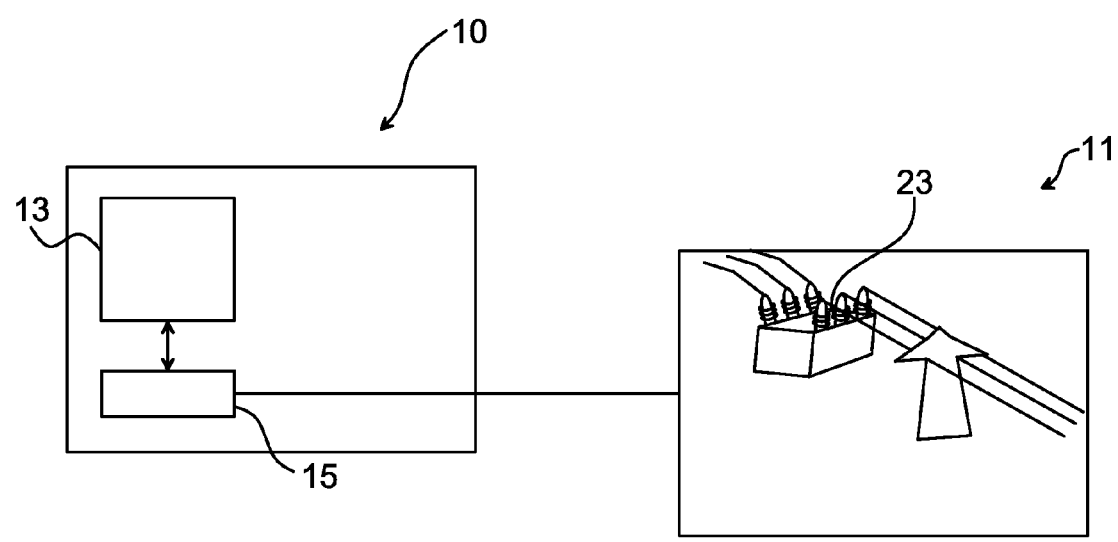
FIG. 2 shows a schematic block diagram of an example of a control system according to the present invention.

FIG. 2 shows an example of a control system 10 connected to an industrial system 11. An industrial system may be any kind of industrial system, such as a power plant, an automated process in a factory, a local electrical distribution network, or a larger part of an electrical grid.

The control system 10 comprises a display device 13 and a processor 15 connected to the display device 13. The processor 15 adapted to receive data from the industrial system 11. Typically, the processor 15 may be connected to the industrial system 11 by means of an interface comprising a data input unit suitable for communicating data from the industrial system 11 to the processor 15. Such devices would be apparent to the skilled person and will therefore not be elaborated further herein.

The display device 13 may typically be a computer screen or similar device able to graphically present data. In a preferred embodiment, the display device is a stereoscopic display of the kind currently being developed by companies such as Philips® and Sony®.

Alternatively, the display device 13 is a conventional display screen able to present conventional three-dimensional images.

It is to be noted that all principles throughout this text generally apply to both stereoscopic presentation and conventional three-dimensional presentation.

The processor 15 may be configured to present a three-dimensional view of a two-dimensional image, such as a single line diagram, on the display screen 13. A single line diagram may represent an industrial system such as a distribution network. In the following, the industrial system 11 will be exemplified by means of a distribution network, however, as already noted above; the industrial system may generally relate to any kind of industrial system or industrial process.

The industrial system 11 in FIG. 2 exemplified by means of a schematic perspective view of a portion of a distribution network comprises a transformer 27, a transmission tower and power lines.

A single line diagram may typically present a view of a plurality of power lines, sub-systems and substations comprising a plurality of generators, transformers, and protection relays. Each of these objects corresponds to elements or equipment in the distribution network. At least some of the objects represented in the single line diagram are associated with respective parameter values relating to the corresponding element's or equipment's status in the distribution network. For instance, the transformer objects in the single line diagram may be associated with currents measured at the primary side or the secondary side of the transformers in the distribution network. The measured current values may be displayed in the single line diagram.

As described above, in prior art, a deviation from an accepted value or behavior of the transformer, resulted in e.g. a change in color of the numerical value presenting the current value to the operator.

According to one example of the present invention, the processor 15 may be configured to receive measured current values of a transformer, wherein when the measured value deviates from an accepted value or accepted behavior of the transformer, the processor 15 will display the transformer or the current value in a near field depth layer of a three-dimensional view of the single line diagram. Of course, the processor is typically also able to receive and process other data than current measurements from transformers. Further examples will be elucidated in the following.

Figure 3A:
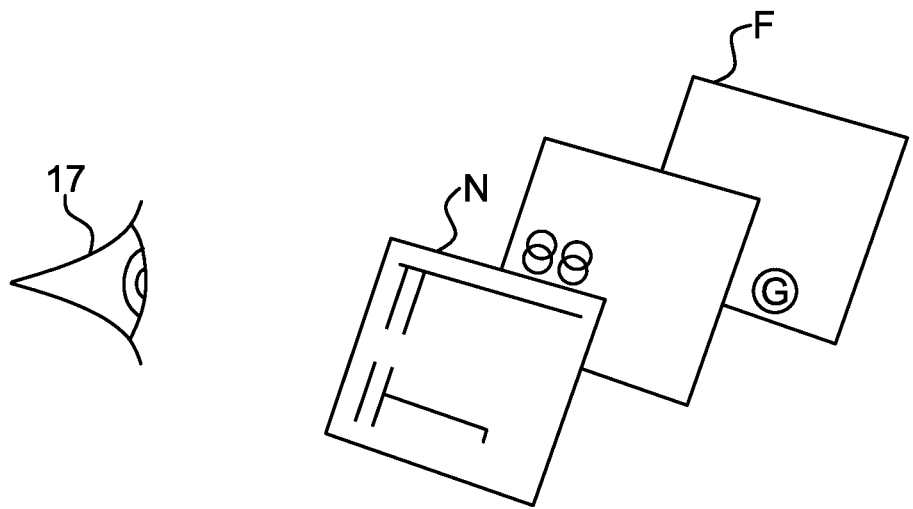
FIG. 3A schematically shows a three-dimensional view of a two-dimensional image according to an example of the present invention.

FIG. 3a schematically shows a three-dimensional view of a two-dimensional image such as single line diagram. It is contemplated that objects representing elements or equipment in the industrial system 11, which for some reason should receive the attention of an operator are displayed on the display screen 13 in a near field depth layer N. Objects which are of less importance at the particular moment, are presented in a far field depth layer F. Generally, the near field depth layer may be construed as a depth layer which in a stereoscopic view or a conventional three-dimensional view is displayed closest to a viewer 17, or is being perceived to be closest by the viewer 17. Thereby, the attention of the viewer will be drawn to the object in question.

Generally, the processor 15 may be configured to determine the parameter value for those objects which are associated with a parameter value. The parameter value may thereafter be mapped to a depth layer. A mapping of the parameter value is hence performed, wherein the object to which the parameter value pertains may be assigned to a suitable depth layer.

The three-dimensional view may be a stereoscopic view. Alternatively, the three-dimensional view may be a conventional three-dimensional perspective view.

Figure 3B:
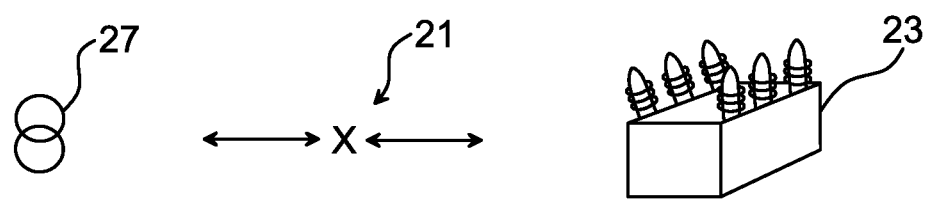
FIG. 3B shows an example of a relationship between an object in a three-dimensional view, a parameter value, and the actual equipment in the industrial system.

FIG. 3b shows the relationship between an object 27 exemplified by a symbol of a transformer, a parameter value 21 associated with the objects, such as a measured current value of the transformer, and the element or equipment in the distribution network, a transformer 23.

Figure 4A:
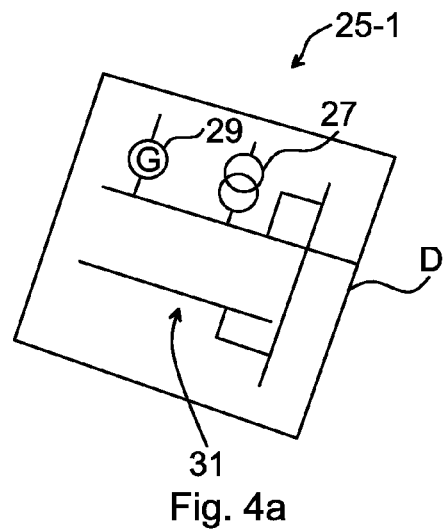
FIGS. 4A-C show an example of an object corresponding to an element of an industrial system changing depth layer due to a change in a status of the corresponding element in the industrial system.
Figure 4B:
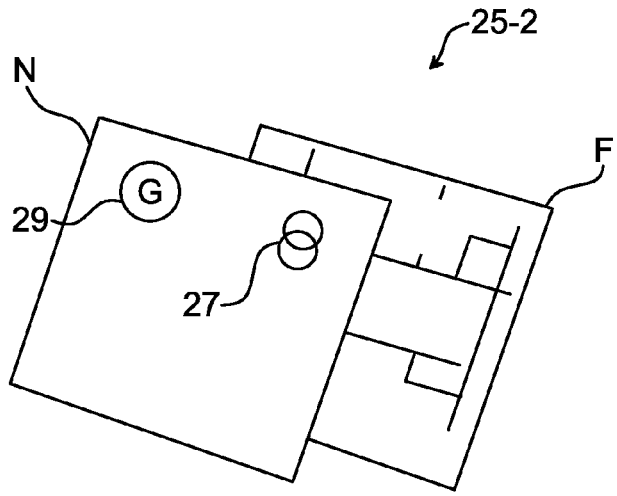

FIGS. 4a-b shows an example of the dynamics of the three-dimensional view according to an example of the present invention.

FIG. 4a shows a first state 25-1 of a three-dimensional view. A depth layer D is shown, in which all information pertaining to the industrial system is shown. Objects displayed in the three dimensional view are a transformer object 27, a generator object 29, and a power line system object 31.

It is also possible, within the scope of the invention, to define each power line with different voltage as separate objects, or having different portions of the same power line defining separate objects.

For simplicity, in the present example, a maximum of two depth layers is shown, viz. a near field depth layer N and a far field depth layer F. However, it is to be understood that a plurality of depth layers may be displayed simultaneously, each layer presenting at least one object.

In the first step 25-1 of the stereoscopic three-dimensional view, all parameter values are such that their corresponding objects 27, 29, and 31 are mapped to the same depth layer D.

In FIG. 4b, the parameter values for the transformer object 27 and the generator object 29 have changed. In particular, the elements or equipment which they represent are subject to either an alarm or a trend which should be brought to the attention of the operator monitoring the industrial system. Thus, the objects' respective parameter value does not comply with criterions associated with the transformer and generator which they represent in the single line diagram. As an example, there may be a fault in the distribution network such that the current values measured at the transformer and the generator increase.

As a result, the processor maps the parameter values, which pertain to incoming measured data from the industrial system, to a near field depth layer N and displays the transformer object 27 and the generator object 29 in the near field depth layer N. The power line system object 31 has a parameter value complying with system requirements. Therefore, the power line system object 31 remains in the depth layer D now acting as the far field depth layer F.

In one embodiment, those objects which are associated with an alarm or the like are mapped to a near field depth layer, and the objects which comply with system requirements or criterions, are kept in their previous layer, which becomes a far field depth layer, as described hereabove.

In an alternative embodiment, those objects which are associated with an alarm or the like are kept in the depth layer D, and the objects which comply with system requirements or criterions, are mapped to a far field depth layer. Thus, the depth layer D becomes the near field depth layer. In this case, either the mapping function dynamically changes so as to allow the same parameter value to be mapped to a different depth layer when the parameter value is kept constant or within an accepted criterion, or alternatively .

Figure 4C:
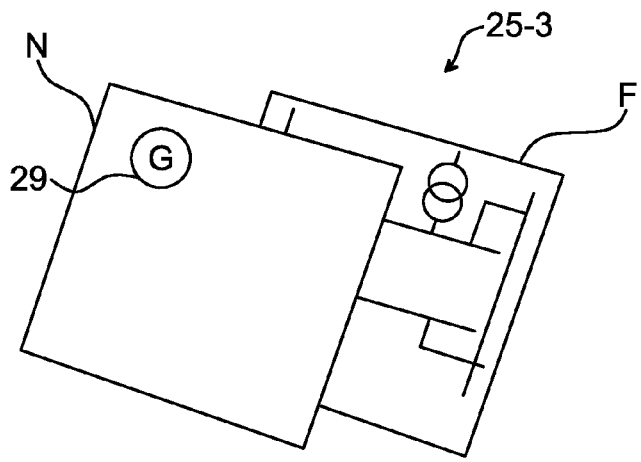

In FIG. 4c, the parameter value for the transformer object 27 has changed and now complies with the criterions for the transformer in the distribution network. This may come as a result of the fault condition being solved in that part of the distribution network where the transformer is located. The transformer object 27 is therefore displayed in the far field depth layer F. The parameter value for the generator object 29 still does not comply with criterions to be fulfilled by the generator in the distribution network. Thus, the generator object 29 is still presented in the near field depth layer N. The power line system object 31 has a parameter value fulfilling system requirements or criterion and is displayed in the far field depth layer F.

To further explain examples of the methods described above, reference will now be made to FIGS. 5a-c showing flow charts of variations of the present invention.

The process will for the sake of clarity be exemplified by means of at least one object instead of referring to a plurality of objects. However, it is to be understood that a similar process as will be described in the following applies to any object with which there is associated a parameter value. The process may for instance be carried out in parallel for a plurality of such objects.

Figure 5A:
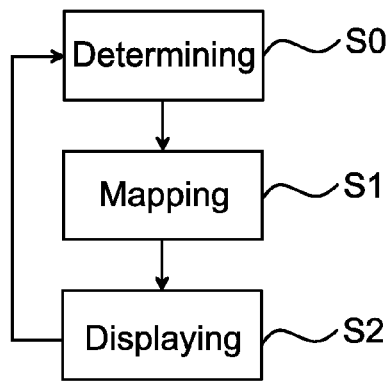
FIGS. 5A-C shows flow charts of examples of a method according to the present invention.
Figure 5B:
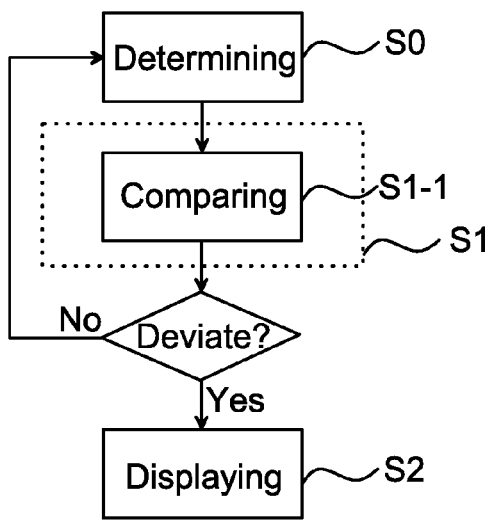
Figure 5C:
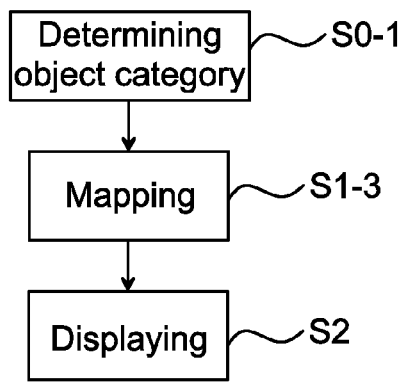

With reference to FIG. 5a, in a step S0 a parameter value of at least one object is determined. The parameter value may pertain to a measured quantity of the equipment to which the parameter value relates. Alternatively, the parameter value may pertain to a calculated parameter in the industrial system.

In a step S1, the parameter value is mapped according to a mapping function to a depth layer, which depth layer defines part of the three-dimensional. view. The steps of determining S0 and mapping S1 may typically be carried out by the processor 15 of FIG. 2.

In a step S2, the at least one object is displayed in the depth layer by the display device 13.

The above steps S0-S2 may beneficially be repeated continuously, so as to allow for updating the three-dimensional view in case the parameter value takes a value which may indicate an alarm or a trend to be brought to the attention of the operator monitoring the industrial system.

In one embodiment, steps S1 and S2 may not need to be carried out if the parameter values for the at least one object is determined to be unchanged since the last mapping and displaying.

The step S1 of mapping the parameter value to a depth layer in some embodiments involve mapping the parameter value to a near field depth layer of the three-dimensional view when the parameter value deviates from a criterion associated with a corresponding element in the industrial system.

The step S1 of mapping may optionally comprise the step S1-1 of comparing the parameter value of the at least one object with a criterion associated with the corresponding element in the industrial system.

In one embodiment, in case the parameter value deviates from the criterion, the at least one object is removed from a current depth layer in which the object is displayed.

Subsequently, the at least one object is displayed in step S2 in another depth layer. The another depth layer may typically be a near field depth layer.

In one embodiment, instead of removing the object from the previous depth layer (i.e. the current depth layer in the wording above), the object may be displayed also in the previous depth layer while also being displayed in the another depth layer. Thereby the behavior of the object may be traced in time.

The step S1-2 of removing the at least one object from the depth layer and the step S2 of displaying may be implemented by visually moving the at least one object from the depth layer to the another depth layer.

In one embodiment, an object may be visually moved between depth layers any time any object changes depth layer.

In one embodiment, some of the objects or all of the objects may be further associated with an object category. The object category may for instance identify the type of the object in respect of the element or equipment in the industrial system that it represents.

One embodiment may comprise a step S0-1 in which the object category associated with the at least one object is determined. Step S0-1 may be executed in parallel with any other step above. Alternatively step S0-1 may be executed between any of the above steps.

When the object category has been determined, the at least one object is mapped in a step S1-3 to a depth layer based on the parameter. The mapping in step S1-3 may be the same mapping as the mapping of step S1, or may be a separate step of mapping utilizing another mapping function than the mapping function of step S1.

In one embodiment in a step S0-1, a range of values are associated with at least one depth layer. Thereby the mapping function may determine if an object is to be mapped to that depth layer based on the parameter value, e.g. by comparing the parameter value of that object with the range of values associated with the depth layer. Generally, the step S0-1 of associating may be carried out for a plurality of depth layers.

The skilled person in the art realizes that the present invention by no means is limited to the embodiments described above. On the contrary, many modifications and variations are possible within the scope of the appended claims.

What claimed is:

1. A method for displaying a two-dimensional image in a three-dimensional view, the two-dimensional image being formed by a plurality of objects representing elements of an industrial system, the three-dimensional view being displayed on a display device of a control system of the industrial system, wherein at least one object is associated with a parameter value pertaining to a state of a corresponding element in the industrial system, wherein the method comprises providing a processor configured for:

determining the parameter value for the at least one object,
   mapping the parameter value to a depth layer, which depth layer defines part of the three-dimensional view, and
   displaying the at least one object in the depth layer,
   wherein the step of mapping comprises mapping the at least one object to a depth layer in a near field of the three-dimensional view when the parameter value deviates from a criterion associated with a corresponding element in the industrial system, the criterion including an accepted behavior of the corresponding element, wherein the deviation from the criterion indicates an alarm or a trend to be brought to the attention of an operator monitoring the industrial system.

2. The method as claimed in claim 1, comprising:
   repeating the steps of determining and mapping, and provided that the mapping determines another depth layer, displaying the at least one object in the another depth layer.

3. The method as claimed in claim 1, wherein the step of mapping comprises comparing the parameter value of the at least one object with the criterion associated with the corresponding element in the industrial system.

4. The method as claimed in claim 2, wherein the step of displaying comprises visually moving the at least one object from the depth layer to the another depth layer.

5. The method as claimed in claim 1, comprising:
   determining an object category associated with the at least one object, the object category pertaining to a category of its element in the industrial system, and
   mapping the at least one object to a depth layer based on the object category.

6. The method as claimed in claim 1, comprising associating a range of parameter values with the depth layer.

7. The method as claimed in claim 1, wherein each parameter value corresponds to a dynamic process of the industrial system.

8. The method as claimed in claim 1, wherein the two-dimensional image is a schematic diagram of the industrial system.

9. The method as claimed in claim 1, wherein the three-dimensional view is a stereoscopic view.

10. A computer program stored on a non-transitory computer readable medium, which computer program when executed performs the steps of a method for displaying a two-dimensional image in a three-dimensional view, the two-dimensional image being formed by a plurality of objects representing elements of an industrial system, the three-dimensional view being displayed on a display device of a control system of the industrial system, wherein at least one object is associated with a parameter value pertaining to a state of a corresponding element in the industrial system, wherein the method comprises:

determining the parameter value for the at least one object,
   mapping the parameter value to a depth layer, which depth layer defines part of the three-dimensional view, and
   displaying the at least one object in the depth layer,
   wherein the step of mapping comprises mapping the at least one object to a depth layer in a near field of the three-dimensional view when the parameter value deviates from a criterion associated with a corresponding element in the industrial system, wherein the deviation from the criterion indicates an alarm or a trend to be brought to the attention of an operator monitoring the industrial system.

11. A control system for controlling an industrial system, the control system comprising:
   a display device configured to display a two-dimensional image in a three-dimensional view, which two-dimensional image is formed by a plurality of objects representing the industrial system, wherein at least one object is associated with a parameter value pertaining to a state of a corresponding element in the industrial system,
   a processor configured to determine the parameter value for at least one object, and to map the parameter value to a depth layer, which depth layer defines part of the three-dimensional view,
   the display device being configured to display the at least one object in the depth layer,
   wherein the processor is arranged to map the at least one object to a depth layer in a near field of the three-dimensional view when the parameter value deviates from a criterion associated with a corresponding element in the industrial system, wherein the deviation from the criterion indicates an alarm or a trend to be brought to the attention of an operator monitoring the industrial system.

12. The method as claimed in claim 1, wherein the processor comprises two or more processors.

13. The method as claimed in claim 2, wherein the steps are repeated continuously.

* * * * *